(12) United States Patent
Wada

(10) Patent No.: US 7,884,904 B2
(45) Date of Patent: Feb. 8, 2011

(54) IMAGE DISPLAY DEVICE

(75) Inventor: Minoru Wada, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 293 days.

(21) Appl. No.: 12/160,509

(22) PCT Filed: Jan. 10, 2007

(86) PCT No.: PCT/JP2007/050542

§ 371 (c)(1),
(2), (4) Date: Jul. 10, 2008

(87) PCT Pub. No.: WO2007/081037

PCT Pub. Date: Jul. 19, 2007

(65) Prior Publication Data

US 2010/0157216 A1 Jun. 24, 2010

(30) Foreign Application Priority Data

Jan. 12, 2006 (JP) ............................. 2006-005357

(51) Int. Cl.
G02F 1/1333 (2006.01)
G02B 5/00 (2006.01)
(52) U.S. Cl. ........................... 349/122; 349/56; 349/58; 359/894
(58) Field of Classification Search ................. 349/122, 349/56, 58, 138, 158, 160; 359/894
See application file for complete search history.

(56) References Cited

U.S. PATENT DOCUMENTS

| 6,844,047 B2 * | 1/2005 | Kaminsky et al. ........... 428/141 |
| 2005/0174525 A1 * | 8/2005 | Tsuboi et al. ................ 349/158 |
| 2005/0238846 A1 * | 10/2005 | Arakatsu et al. ............. 428/141 |
| 2009/0190084 A1 * | 7/2009 | Sun ............................. 349/157 |
| 2010/0157216 A1 * | 6/2010 | Wada ........................... 349/122 |

FOREIGN PATENT DOCUMENTS

| JP | 9-304604 A | 11/1997 |
| JP | 2003-107215 A | 4/2003 |
| JP | 2003-149634 A | 5/2003 |
| JP | 2004-198743 A | 7/2004 |
| JP | 2004-295080 A | 10/2004 |
| JP | 2005-128214 A | 5/2005 |

OTHER PUBLICATIONS

Form PCT/ISA/210 (International Search Report) dated Feb. 20, 2007.

(Continued)

*Primary Examiner*—Brian M Healy
(74) *Attorney, Agent, or Firm*—Buchanan Ingersoll & Rooney PC

(57) ABSTRACT

An image display device provided with a panel comprising a substrate comprising glass or resin, a front side laminated body and a back side laminated body, and an optical member adjacent to the back side laminated body, wherein the surface of the optical member going to contact with the back side laminated body has an arithmetic average roughness (Ra) of 6 μm or more. The image display device can maintain excellent display performance under conditions with significant circumstance variations.

15 Claims, 1 Drawing Sheet

OTHER PUBLICATIONS

Form PCT/ISA/237 (Written Opinion of the International Searching Authority) dated Feb. 20, 2007.
Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2007/050542, Jul. 24, 2008, The International Bureau of WIPO, Geneva, CH.

* cited by examiner

IMAGE DISPLAY DEVICE

TECHNICAL FIELD

The present invention relates to an image display device such as a flat panel display, in particular, to an image display device useful for a liquid crystal display device for use in a monitor of a personal computer, a television etc.

BACKGROUND ART

Since a liquid crystal display has such various advantages as is operable with a low voltage and low power consumption, and capable of miniaturization and thickness reduction, development is proceeding for such applications as a monitor of a personal computer and portable devices, and a TV. Along with this, recently, development of a large size screen proceeds.

As well as a large size screen, in a liquid display device, thickness reduction of a whole image display device also proceeds. The thickness reduction of an image display device can be achieved by constituting an image display device using a panel provided with a substrate made of thin glass or resin. However, when such liquid crystal panel displays black screen after having been exposed to a high temperature and high humidity, there occurs a "circular unevenness" phenomenon, in which light leaks circularly, on a panel (screen), which brings about serious problem on the display performance.

On this occasion, observation of a panel teaches occurrence of warpage in the panel. That is, when the image display device is observed from the front side (viewer side), the central portion of the panel is concaved and the edge portions warp toward the front side.

The occurrence of aforementioned warpage of a panel is caused by the fact that, relative to a substrate made of glass or resin which does not generate warpage in nature, various types of members laminated on the viewer side and the back side thereof (hereinafter, the back side relative to the viewer side is occasionally referred to as "the back side" simply) generate expansion/contraction due to heating and moisture absorption/desorption to result in difference in the expansion/contraction between the viewer side and back side, thereby disrupting a balance of forces between front and back sides of an image display device. In an ordinary image display device, the viewer side surface of the panel is opened, but the rear face is mounted in a casing to become in a quasi sealed state. It is considered that, consequently, difference occurs in heating and moisture absorption/desorption amount between the front side laminated body and the back side laminated body between which the substrate is interposed to result in occurrence of difference in expansion/contraction, too, and generation of warpage.

Taking a liquid crystal display device as an example, a liquid crystal display device is manufactured by arranging polarizing plates for producing polarized light on both sides of a liquid crystal cell constituted of liquid crystal sealed between glass substrates, laminating various optical elements such as a retardation plate, an antireflection film or a brightness-enhancing membrane according to need, fixing the periphery thereof with a fixing frame comprising a metallic plate such as stainless steel plate, which is called a "bezel," to form a liquid crystal module, and assembling and housing the liquid crystal module with other constitutional members in a casing.

According to such reason that, temperature rises due to a backlight when a light source switch of a liquid crystal display device is on, sometimes difference in temperature or humidity may occur between the front side (viewer side) and the backlight side of the device. In this case, it is considered that the front side laminated body and backlight side laminated body including a polarizing plate are exposed to different temperature or humidity conditions while taking the liquid cell as a boundary, and that respective laminated bodies are subjected to the influence of the difference in these conditions. When warpage occurs in a panel, the fringe portion or four corners of the panel not only contact with the casing, but also stick fast to the backlight arranged on the back side to generate display performance problems. Further, a "corner unevenness" phenomenon in which light leaks unevenly from four corners of a panel (screen) when the screen is in black level of display, which sometimes causes a very large problem in display performance.

In order to improve warpage of a panel due to environmental alteration, in JP-A-2003-149634, in a liquid crystal display device prepared by arranging polarizing plates comprising a polarizer with a protective film on both sides of a liquid crystal cell and further laminating a brightness-enhancing film to the back side polarizing plate, the thickness of the protective film used for the front side polarizing plate and the thickness of the protective film used for the back side polarizing plate are set to be not equal. However, when the protective film of the laminated body on the viewer side arranged on the front side was thinned, there was such problem that the polarizer tends to deteriorate easily due to humidity to lower optical performances.

DISCLOSURE OF THE INVENTION

The present invention aims to provide an image display device that inhibits the occurrence of a "circular unevenness" phenomenon in which light leaks circularly on a panel (screen) when the panel displays black screen after having been exposed to a high temperature and high humidity to inhibit the degradation of display performance.

The inventors of the invention found that the "circular unevenness" occurs when a liquid crystal display device is left for a certain period of time under a high temperature and humidity, taken out under ordinary temperature and humidity, whose backlight is lighted and several hours lapses, and that, at that time, the front side laminated body that has been exposed more strongly to the high temperature and humidity contracts to disrupt the balance between forces of the front and back sides of the panel and warpage occurs.

According to the result of further inspection, when a liquid crystal display device has been left under a high humidity, members of the front side laminated body and back side laminated body have absorbed moisture. After that, when a backlight is lighted under ordinary temperature and humidity, the front side laminated body of the panel is dehumidified and contracts, but, in the back side laminated body, dehumidification and contraction are delayed because the periphery thereof is surrounded by housing etc. Thus, when the cross-section is observed with the front side (viewer side) up, the panel warps concavely. At this time, the back side laminated body contacts with the member on the backlight side in a rounded state.

After that, although a portion of the back side laminated body that does not contact with the member on the backlight side is dehumidified and contracts, a contact portion is hardly dehumidified because air hardly flows, and does not contract. It was found that, consequently, phase difference occurs caused by difference in contraction forces due to difference in dehydrations to generate the circular unevenness.

In the light of the aforementioned phenomenon, a further inspection was conducted. As the result, it was found that occurrence of the circular unevenness can be prevented by using an optical member whose surface going to contact with the back side laminated body has an arithmetic average roughness (Ra) of 6 μm or more as one on the backlight side adjacent to the back side laminated body in order to allow air to flow sufficiently through the portion of the back side laminated body contacting with the member on the backlight side, when a panel is assembled in an image display device.

Specifically, the aforementioned problem can be solved by the following means.

(1) An image display device provided with a panel comprising a substrate comprising glass or resin, a front side laminated body provided on the viewer side of the substrate and a back side laminated body provided on the back side of the substrate, and an optical member adjacent to the back side laminated body of the panel, wherein the front side laminated body and the back side laminated body include a polarizer, and the surface of the optical member going to contact with the back side laminated body has an arithmetic average roughness (Ra) of 6 μm or more.

(2) The image display device according to (1), wherein the surface of the optical member going to contact with the back side laminated body has an arithmetic average roughness of 7 μm or more.

(3) The image display device according to (1) or (2), wherein the long edge of the panel is 40 cm-350 cm.

(4) The image display device according to any of (1)-(3), wherein the front side laminated body and the substrate are adhered via an adhesive layer and the thickness of the adhesive layer is 30 μm-100 μm.

(5) The image display device according to any of (1)-(4) wherein the surface of the panel on the viewer side is opened and the back side of the panel is closed with a casing.

(6) The image display device according to any of items (1)-(5), wherein the substrate is a liquid crystal cell and the back side laminated body includes an optical compensatory film.

(7) The image display device according to (6), wherein the front side laminate body has a viewer side protective film provided on the viewer side, a polarizer, and a substrate side protective film provided on the substrate side in this order, and at least one of the viewer side protective film and the substrate side protective film comprises cellulose acylate.

(8) The image display device according to any of (1)-(7) employing a liquid crystal display mode of VA system or IPS system.

(9) The image display device according to any of (1)-(7) employing a liquid crystal display mode of TN system or OCB system.

According to the invention, it is possible to provide an image display device in which occurrence of the circular unevenness is prevented to inhibit the degradation of display performance.

BEST MODE FOR CARRYING OUT THE INVENTION

Figure 1:
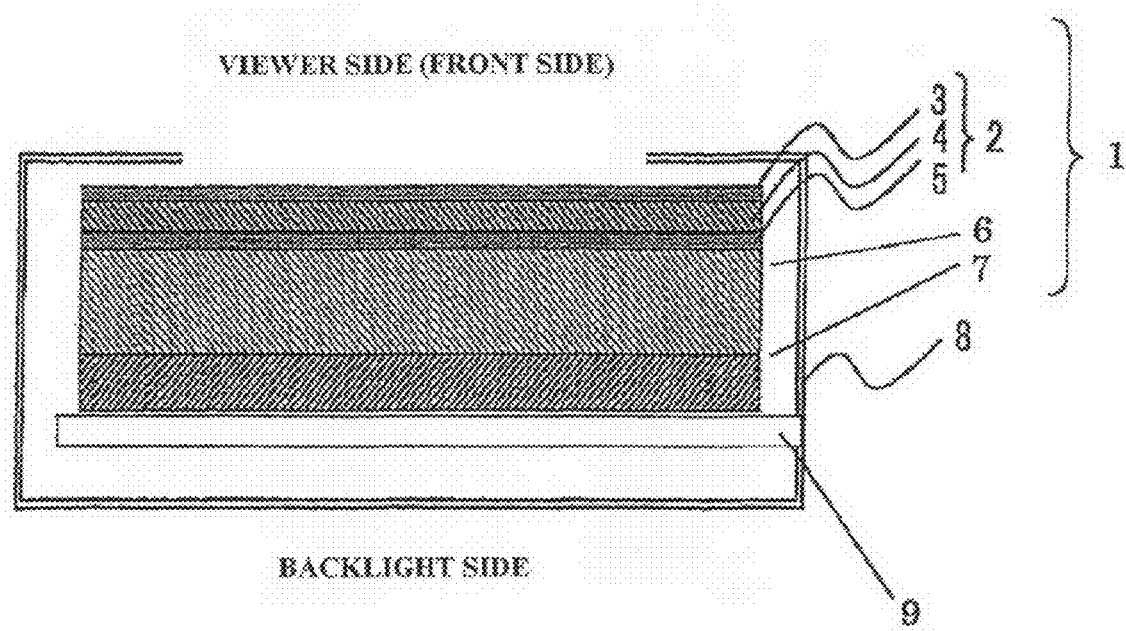
FIG. 1 is a cross-sectional view showing a constitution example of the image display device of the present invention.

Hereinafter, the image display device of the present invention will be described in detail. The following description about the constitutional features is occasionally based on the typical embodiment of the invention, but the invention is not limited to such embodiment. The numerical range represented by using "-" herein means a range including numerical values described before and after "-" as the lower limit and the upper limit, respectively.

(Constitution of Image Display Device)

The image display device of the invention has a panel comprising a substrate comprising glass or resin, a front side laminated body provided on the viewer side of the substrate and a back side laminated body provided on the back side of the substrate, and an optical member adjacent to the back side laminated body of the panel.

Here, the "optical member adjacent to the back side laminated body" is an optical member that is adjacent to the back side laminated body and lies on the backlight side. Specific examples thereof include a a, brightness-raising film, a light-diffusing sheet, a light-diffusing plate and a prism sheet.

In the image display device of the invention, the surface of the optical member going to contact with the back side laminated body has an arithmetic average roughness (Ra) of 6 μm or more. As the arithmetic average roughness (Ra) of the surface of the optical member going to contact with the back side laminated body, 7 μm or more is further preferred. When the surface of the optical member going to contact with the back side laminated body has an arithmetic average roughness (Ra) of less than 6 μm, the circular unevenness tends to occur. Although there is no particular upper limit on the arithmetic average roughness (Ra) of the surface of the optical member going to contact with the back side laminated body, the average roughness is preferably 70 μm or less, further preferably 60 μm or less. An "arithmetic average roughness (Ra)" in the invention means the arithmetic average roughness defined by the formula described in JIS B 0601-2001. The arithmetic average roughness (Ra) of the surface of the optical member adjacent to the hack side laminated body on the backlight side, which is going to contact with the back side laminated body, can be measured with a contact probe type surface roughness gauge etc.

The front side laminated body and the back side laminated body include a polarizer. The polarizer of the front side laminated body may be provided with a viewer side protective film on the viewer side thereof, and a substrate side protective film on the substrate side. At least one of the viewer side protective film and substrate side protective film is preferably constituted of cellulose acylate.

Similarly, the polarizer of the back side laminated body may be provided with a backlight side protective film on the backlight side, and a substrate side protective film on the substrate side. At least on of the backlight side protective film and the substrate side protective film preferably comprises cellulose acylate.

In addition, the image display device of the invention is preferably provided with a backlight. As the backlight, publicly known one may be used suitably.

The panel constituting the image display device of the invention may be provided with another optical film or functional layer according to need. The panel is preferably disposed in the image display device so that the surface of the viewer side is opened and the rear face is closed with a casing.

In addition, the device has a construction in which various types of optical members such as a brightness-enhancing film and a light-diffusing sheet are laminated between the panel and the backlight according to need.

A constitution example of the image display device of the invention is shown in FIG. 1. In FIG. 1, the image display device of the invention is constituted by mounting a panel 1 and a backlight side optical member 9 in a casing 8, wherein the surface of the viewer side (upside on the paper) of the panel 1 is opened and the back side (backlight side on downside on the paper) is sealed with the casing 8.

The panel 1 is constituted of a front side laminated body 2, a substrate 6 and a back side laminated body 7, and the front side laminated body 2 is constituted of a viewer side protective film 3, a polarizer 4 and a substrate side protective film 5. Between the panel 1 and the backlight, the optical member 9 constituted of a brightness-enhancing film, a brightness-raising film, a light-diffusing sheet, light-diffusing plate, prism sheet etc. is laminated, wherein, by setting the arithmetic average roughness of the surface of the optical member 9 going to contact with the back side laminated body adjacent to the back side laminated body on the backlight side to be 6 µm or more, occurrence of circular unevenness can be prevented.

The size of the panel 1 is not particularly limited, but the long side is preferably 40 cm-350 cm, further preferably 45 cm-300 cm, particularly preferably 50 cm-250 cm.

The "liquid crystal display device" of the invention has a construction in which a liquid crystal cell constituting a substrate is disposed with polarizing plates (front side laminate body and back side laminated body) on both sides thereof, and, according to need, various types of optical elements such as a retardation film, an antireflection film and a brightness-enhancing film are laminated thereon. The substrate in the invention corresponds to a liquid crystal cell in the case of a liquid crystal display device, and respective laminated bodies correspond to various types of optical elements such as a polarizing plate, a retardation film and an antireflection film.

In general, a liquid crystal display device is produced by fixing the periphery portion of a liquid crystal panel with a fixing frame comprising a metal plate such as stainless steel, which is referred to as a "bezel," to form a liquid crystal module, and assembling and housing the liquid crystal module in a casing with other constitutional members. It can be used also in the invention in the same constitution by fixing the periphery of the panel with such fixing frame as a bezel.

(Substrate)

The substrate constituting the image display device of the invention comprises glass or resin (plastic). The glass or resin may contain an additive. Further, the substrate may hold a constitutional element other than glass or resin. The "substrate" used herein is preferably a plate that holds a liquid crystal layer.

As the substrate, for example, glass or resin usually used for a liquid crystal cell application can be adopted as a constitutional element. When a liquid crystal cell is used as the substrate, liquid crystal can be sealed between cell substrates comprising glass or resin. On both sides of the liquid crystal cell, transparent conductive films can be provided, and further, on the front side (viewer side) of the transparent conductive film, a color filter can be provided. From the viewpoint of reducing the thickness of a liquid crystal display device, the substrate has a thickness of preferably 1 mm or less, more preferably 0.7 mm or less, most preferably 0.5 mm or less. There is no particular limitation on the size of the substrate, but, since warpage of a liquid crystal panel easily occurs when the area of the substrate is wide, the invention is particularly effective when it is used for a liquid crystal display device with a large screen.

Materials that can be used for a substrate made of resin are not particularly limited and all of conventionally publicly known materials can be employed when they have transparency and mechanical strength. Examples of the resin that can be used for the substrate made of resin include thermoplastic resins such as polycarbonate, polyarylate, polyether sulfone, polyester, polysulfone, polymethyl methacrylate, polyetherimide and polyamide, and thermosetting resins such as epoxy-based resin, unsaturated polyester, polydiallyl phthalate and polyisobornyl methacrylate. Such resins may be used in one type or in combination of two or more types, or also as a copolymer or mixture with another ingredient.

(Front side Laminated Body and Back, side Laminated Body)

Next, the front side laminated body and the back side laminated body in the invention will be described. The front side laminated body and the back side laminated body are preferably ones that include at least a polarizer and function as a polarizing plate.

In the invention, the type of a polarizing plate (front side laminated body and back side laminated body) is not particularly limited when it does not ruin the effect of the invention. For example, an absorption type polarizing plate, which is formed by laminating a polarizer prepared by soaking a polyvinyl alcohol (PVA) film with iodine having dichroic property or a dichroic dye, stretching it to align followed by cross-linking and drying, with a protective film such as a triacetylcellulose (TAC) film, can be preferably used. As the polarizer, one having an excellent optical transmittance and polarization degree is preferred. The optical transmittance of the front side laminated body and the back side laminated body is preferably 30% -50%, further preferably 35%-50%, most preferably 40%-50%. The polarization degree of the front side laminated body and the back side laminated body is preferably 90% or more, further preferably 95% or more, most preferably 99% or more. A transmittance of less than 30%, or a polarization degree of less than 90% results in a low brightness or contrast of an image display device, which may sometimes lower display quality level. The thickness of the polarizer is preferably 1-50 µm, further preferably 1-30 µm, most preferably 8-25 µm.

The polarizer of the front side laminated body and the back side laminated body can have a viewer side protective film provided on the viewer side or a backlight side protective film provided on the backlight side, and a substrate side protective film provided on the substrate side. At least one of the viewer side protective film and the substrate side protective film preferably comprises cellulose acylate.

In the invention, adhesion treatment of the polarizer and respective protective films is not particularly limited, and can be effected via, for example, an adhesive comprising vinyl alcohol-based polymer, or an adhesive comprising a water-soluble cross-linking agent of vinyl alcohol-based polymer such as boric acid or borax, glutaraldehyde or melamine, or oxalic acid. In particular, from the viewpoint of the best adhesiveness with a polyvinyl alcohol-based film, the use of a polyvinyl alcohol-based adhesive is preferred. Such adhesive layer can be formed as a coated and dried layer of an aqueous solution, or the like. When the aqueous solution is prepared, other additives and a catalyst such as an acid can be blended according to need.

As the material forming respective protective films, a polymer excellent in optical performance, transparency, mechanical strength, thermal stability, moisture-blocking performance, isotropy and the like is preferred. For example, polycarbonate-based polymers, polyester-based polymers such as polyethylene terephthalate and polyethylene naphthalate, acrylic polymers such as polymethyl methacrylate, and styrene-based polymers such as polystyrene and acrylonitrile-styrene copolymer (AS resin) can be mentioned. Further, the example includes polyolefins such as polyethylene and polypropylene, polyolefin based-polymers such as ethylenepropylene copolymer, vinyl chloride-based polymers, amide--based polymers such as nylons and aromatic polyamides, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy--based polymers, and polymer mixtures of above-mentioned polymers. Further, respective protective films used in the invention may be also formed as a hardened layer of an ultraviolet ray-setting type or a thermosetting type resin such as acrylic, urethane-based, acrylic urethane-based, epoxy-based or silicone-based resin.

In the invention, as a material for forming respective protective films, thermoplastic norbornene-based resin can be preferably used. AS the thermoplastic norbornene-based resin, ZEONEX and ZEONOR manufactured by ZEON CORPORATION, and ARTON manufactured by JSR can be mentioned.

In addition, as the material for forming respective protective films, cellulose-based polymer such as cellulose acylate represented by triacetyl cellulose, which is excellent in laminating property with a polarizer and has been conventionally used as a transparent protective film of a polarizing plate, can be also used preferably.

Respective protective films for use in the invention may be film-formed by thermofusion of a thermoplastic polymer resin, or by solution film-forming from a solution uniformly dissolving a polymer (solvent casting method). In the case of the thermofusion film-forming, various additives (e.g., a compound for lowering optical anisotropy, wavelength dispersion controlling agent., ultraviolet rays protective agent, plasticizer, deterioration inhibitor, fine particles, optical property-adjusting agent) can be added at the thermofusion. On the other hand, when preparing the protective film from a solution, to the polymer solution (hereinafter, referred to as a "dope"), various additives (e.g., a compound for lowering optical anisotropy, wavelength dispersion controlling agent, ultraviolet rays protective agent, plasticizer, deterioration inhibitor, fine particles, optical property-adjusting agent) corresponding to applications can be added in respective preparation processes. As to the addition timing of the additive, any step in dope formation is allowable, and the step may be the last step of the dope formation.

To the protective film of the polarizer on the liquid crystal cell side (substrate side protective film), an optical compensatory film may be used according to need. The optical compensatory film generally indicates an optical material for compensating view angles of a liquid crystal display device in oblique directions, and is the same meaning as a retardation plate and an optical compensatory sheet. The optical compensatory film may be of an integrated type formed by giving optical compensatory performance to the protective film itself of the polarizing plate, for example, it may be a triacetylcellulose acylate film given an optical compensatory performance to form a protective film of a polarizer. For example, it may be a triacetylcellulose film coated with discotic liquid crystal and then integrated with a polarizing plate.

In particular, when the substrate is a liquid crystal cell, it is preferred that the back side laminated body includes an optical compensatory film. The optical compensatory film of the back side laminated body may be of a type having been integrated with the polarizing plate, the same one as described in the section of the front side laminated body, or may be formed by laminating plural optical compensatory films. As optical compensatory films for lamination, mainly polymer films are preferably used. For example, a polymer film having been subjected to biaxial stretching in the plane direction to have birefringence, or a two-direction stretched film such as an inclined orientation polymer film which is uniaxially stretched in the plane direction and also in the thickness direction to control the refractive index in the thickness direction, is used. Furthermore, an inclined orientation film is also used. For example, one prepared by adhering a heat-shrinkable film to a polymer film and carrying out a stretching treatment and/or a contracting treatment under the action of the contraction force thereof by heating, or one prepared by obliquely aligning liquid crystal polymer, can be mentioned.

When providing the back side laminated body with an optical compensatory film, a protective film having a small refraction index anisotropy (not different in-plane direction and thickness direction) may be used as a protective film of the polarizer of the front side laminated body on the liquid crystal cell side (substrate side protective film)

The thickness of the viewer side protective film, backlight side protective film and substrate side protective film is preferably 20 μm-150 μm, further preferably 30 μm-130 μm.

On the viewer side surface of the polarizer, occasionally, a hard coat film, an antireflection film, an antiglare film etc. are suitably provided by lamination or surface treatment. A hard coat film or hard coat treatment is provided for the purpose of preventing the surface of the polarizer from being bruised, etc. For example, it can be formed by a method of attaching a cured membrane excellent in hardness and lubricity by means of a suitable ultraviolet curable resin such as a silicone-based resin on the surface of a transparent protective film. An antireflection film or antireflection treatment is provided for the purpose of antireflection of external light at the surface of a polarizing plate, and an antiglare film or an antiglare treatment is provided for the purpose of preventing disturbance of viewing of transmitted light from a panel due to reflection of external light at the surface of the panel (screen). These functions can be formed by such suitable systems as a roughing system by means of a sandblast system, an emboss system etc., and a system of coating a coating liquid containing transparent fine particles, to give fine irregular construction to the surface of the protective film.

(Adhesive Agent)

In the liquid crystal display device of the invention, upon laminating the front side and back side laminated bodies to the substrate, they are generally adhered with each other by using an adhesive layer including an adhesive agent. These adhesive layers can be formed by a suitable adhesive agent according to conventional one such as acrylic resin. From the viewpoint of preventing a foaming phenomenon or peeling phenomenon due to moisture absorption, and preventing lowering in optical performance due to the difference in thermal expansions, it is preferred that the adhesive layer has a low moisture absorptivity and an excellent heat resistance.

In the liquid crystal display device of the invention, the thickness of the adhesive layer used upon laminating the front side laminated body and the back side laminated body to the substrate is preferably 30 μm-100 μm, more preferably 33 μm-70 μm, further preferably 34 μm-50 μm.

As the material of the adhesive agent, pressure-sensitive adhesives such as an acrylic adhesive, rubber-based adhesive, silicone-based adhesive, urethane-based adhesive, polyether-based adhesive and polyester-based adhesive are preferred.

In the case of an acrylic adhesive, as to monomer for use in acrylic polymer as the base polymer thereof, various types of (meth) acrylic acid esters (here, "(meth) acrylic acid ester" is the collective designation of acrylic acid ester and methacrylic acid ester; hereinafter, the name of compounds denoted with (meth) have the same meaning) can be used. Specific examples of the (meth)acrylic acid ester include methyl (meth)acrylate, ethyl (meth)acrylate, butyl (meth)acrylate, 2-ethylhexyl (meth)acrylate, and phenyl (meth)acrylate. These may be used independently or in combination. Further, in order to give the polarity to the acrylic polymer to be obtained, a small amount of (meth) acrylic acid may be used in place of a part of the (meth)acrylic acid ester. Furthermore, glycidyl (meth)acrylate, 2-hydroxyethyl (meth)acrylate, and N-methylol (meth)acrylamide may be also used in combination as a crosslinkable monomer. According to need, other copolymerizable monomer such as vinyl acetate and styrene may be also used in combination to an extent that does not degrade adhesive properties of the (meth) acrylic acid ester polymer.

Examples of the base polymer of rubber-based adhesive include natural rubber, isoprene-based rubber, styrene-butadiene-based rubber, regenerated rubber, polyisobutylene-based rubber, styrene-isoprene-styrene-based rubber, and styrene-butadiene-styrene-based rubber.

Examples of the base polymer of silicone-based adhesive include dimethyl polysiloxane and diphenyl polysiloxane.

Examples of the base polymer of polyether-based adhesive include polyvinylethyl ether, polyvinylbutyl ether and polyvinylisobutyl ether.

The adhesive for use in the invention can be prepared by, for example, blending (a) the aforementioned base polymer with (b) a compound having a molecular weight of 100,000 or less. The ratio (a):(b) (mass ratio) is more preferably 90:10-20:80.

As (b) the compound having a molecular weight of 100,000 or less, one having a good compatibility with (a) the base polymer when they are blended, optical transparency, and the glass transition temperature (Tg) of 30° C. or more is preferred. For example, there can be mentioned one that has a mass average molecular weight of 100,000 or less and is similar to the base polymer, and that uses a component having a high Tg such as methyl (meth)acrylate as a monomer in a large amount.

The adhesive for use in the invention can be incorporated with a crosslinking agent. As the crosslinking agent, polyisocyanate compounds, polyamine compounds, melamine resin, urea resin and epoxy resin can be mentioned.

Further, the adhesive for use in the invention can suitably use a tackifier, surfactant, filler, antioxidant, UV absorber etc. according to need in the range that does not lead to deviation from the purpose of the invention. As these additives, one suitably selected from conventionally publicly known ones can be used.

The method for forming the adhesive layer is not particularly limited. For example, such conventionally publicly known methods as a method of coating and drying an adhesive solution, and a method of transferring the adhesive layer using a release sheet provided with an adhesive layer can be mentioned.

The size of each layer for use in an image display device is equal to that of the panel (screen). The length of long edge thereof is preferably 10-500 cm from the viewpoint of a practical size and manufacturing, although it depends on the panel size of an image display device. It is more preferably 20-450 cm, further preferably 30-400 cm, particularly preferably 40-350 cm. There is no particular limitation on dimension thereof. However, since warpage of an liquid crystal panel becomes larger when the panel has a wider area, the use of the invention in particular for a liquid crystal display device having a large screen is effective.

The image display device of the invention can be achieved by using liquid crystal cells with various display modes. As the display mode, various display modes have been proposed, including IPS (In-Plane Switching), VA (Vertical Aligned), TN (Twisted Nematic), OCB (Optically Compensated Bend), STN (Super Twisted Nematic), ECB (Electrically Controlled Birefringence), FLC (Ferroelectric Liquid Crystal), AFLC (Anti-ferroelectric Liquid Crystal) and HAN (Hybrid Aligned Nematic). Further, display modes obtained through alignment division of these display modes are also proposed.

In the image display device of the invention, the use of liquid crystal display mode of the VA system or IPS system, or the use of liquid crystal display mode of the TN system or OCB system is preferred.

EXAMPLES

Hereinafter, the characteristics of the present invention will be described more specifically on the basis of Examples and Comparative Examples. The material, use quantity, percentage, treatment content, treatment procedure etc. shown in the following Examples can be arbitrarily changed within a range that does not result in deviation from the purpose of the invention. Accordingly, the scope of the invention should not be construed in a limited way by specific examples shown below.

Example 1

(1) Preparation of Protective Film

Preparation of Transparent Film Sample 101

Each of 100 parts by mass of cellulose acetate having an acetyl-substituted degree of 2.86, 10 parts by mass of triphenyl phosphate (TPP), 400 parts by mass of methylene chloride (first solvent) and 60 parts by mass of methanol (second solvent) was put in a mixing tank and stirred to dissolve, thereby preparing a cellulose acetate solution. The cellulose acetate solution was filtered, which was cast on a metal support and conveyed while being held through a tenter zone at 100° C., then dried by passing through a drying zone at 130° C. for 30 minutes to prepare a transparent film sample 101. The formed transparent film 101 had a residual solvent amount of 0.2% or less and a film thickness of 80 μm. The aforementioned acetyl-substituted degree means the percentage of hydrogen atoms of hydroxyl groups at 2-, 3- and 5-sites of cellulose substituted by acetyl groups. The acetyl-substituted degree is 3 when all the hydrogen atoms of hydroxyl groups at 2-, 3- and 5-sites are substituted by acetyl groups.

(2) Preparation of Panel

The transparent film sample 101 was dipped in a 1.5 mol/L aqueous sodium hydroxide solution at 55° C. for 2 minutes. Then, it was washed in a water washing bath at room temperature, and neutralized with 0.1 mol/L sulfuric acid at 30° C. It was washed in a water washing bath at room temperature again, and further dried with hot air at 100° C. In this way, the surface of respective transparent films were surface-treated.

(Preparation of Iodine-based Polarizing Plate)

A roll-shaped polyvinyl alcohol film having a thickness of 80 μm was continuously stretched 5 times in an aqueous iodine solution and dried to give a polarizer having a thickness of 25 μm.

On both sides of the polarizer having a thickness of 25 μm, the aforementioned surface-treated transparent film sample 101 was laminated as a protective film with a polyvinyl alcohol-based adhesive to manufacture an iodine-based polarizing plate for the front side (viewer side) and back side (back light side).

Next, on the front side of a VA type liquid crystal cell having a size of lateral long edge of 40 cm and a longitudinal short edge of 32 cm using a glass substrate having a thickness of 0.5 mm, the polarizing plate was laminated so that the direction of the absorption axis of polarizer of the polarizing plate became parallel to the long edge direction of the panel, and on the back side of the VA type liquid crystal cell, the polarizing plate was laminated so that the absorption axis of polarizer of the polarizing plate crosses perpendicularly to the absorption axis of the front side polarizing plate, via an acrylic adhesive having a thickness of 27 μm to prepare a liquid crystal panel.

(3) Preparation of Backlight Side Optical Member

Respective metal molds were prepared for preparing acrylic resin sheets, by injection molding, having saw tooth wave-like irregularity of i) 80 μm, ii) 56 μm, iii) 48 μm, iv) 40 μm and v) 32 μm in cycle and thickness, respectively, on one surface of a sheet having a long side of 40 cm, short side of 32 cm and thickness of 200 μm.

An arithmetic average roughness of the surface was measured for respective surfaces of the acrylic sheet faces having the irregularity prepared by using obtained metal molds with a contact probe type surface roughness gauge (trade name: Surfcorder, manufactured by Kosaka Laboratory Ltd.) to give i) 10 μm, ii) 7 μm, iii) 6 μm, iv) 5 μm and v) 4 μm, respectively. Here, the arithmetic average roughness was obtained according to the method described in JIS B 0601-2001.

(4) Evaluation of Liquid Crystal Display Device by Wet Heat Treatment

The panel prepared in above (2) Preparation of Panel was left under conditions of temperature of 40° C. and relative humidity of 90% for four days.

After the treatment, on a glass plate, the acrylic sheet prepared in above (3) Preparation of Backlight Side Optical Member was placed so that the surface having the irregularity faced upward, and further on it, the aforementioned panel was placed, which was moved to a circumstance of temperature of 36° C. and relative humidity of 30%.

After that, the panel was placed on a light table, which was observed in a dark room to give such results that the circular unevenness was observed for panels on acrylic sheets having an arithmetic average roughness (Ra) of 5 μm or less, but that almost no circular unevenness was observed for a panel on the acrylic sheet having an Ra of 6 μm. Further, no circular unevenness was observed at all for panels on acrylic sheets having an Ra of 7 μm or more.

INDUSTRIAL APPLICABILITY

As described above, in the image display device of the invention, since the occurrence of circular unevenness is prevented, the lowering in display performance can be suppressed effectively. Consequently, even under conditions with significant circumstance variations, excellent display performance can be maintained. Accordingly, the invention has a high industrial applicability.

The invention claimed is:

1. An image display device provided with a panel comprising a substrate comprising glass or resin, a front side laminated body provided on the viewer side of the substrate and a back side laminated body provided on the back side of the substrate, and an optical member adjacent to the back side laminated body of the panel, wherein the surface of the optical member going to contact with the back side laminated body has an arithmetic average roughness (Ra) of 6 μm or more and wherein a long edge of the panel is 40 cm-350 cm.

2. The image display device according to claim 1, wherein the surface of the optical member going to contact with the back side laminated body has an arithmetic average roughness of 7 μm or more.

3. The image display device according to claim 1, wherein the front side laminated body and the substrate are adhered via an adhesive layer and the thickness of the adhesive layer is 30 μm-100 μm.

4. The image display device according to claim 1, wherein the surface of the panel on the viewer side is opened and the back side of the panel is closed with a casing.

5. The image display device according to claim 1, wherein the substrate is a liquid crystal cell and the back side laminated body includes an optical compensatory film.

6. The image display device according to claim 5, wherein the front side laminate body has a viewer side protective film provided on the viewer side, a polarizer, and a substrate side protective film provided on the substrate side in this order, and at least one of the viewer side protective film and the substrate side protective film comprises cellulose acylate.

7. The image display device according to claim 1 employing a liquid crystal display mode of VA system or IPS system.

8. The image display device according to claim 1 employing a liquid crystal display mode of TN system or OCB system.

9. An image display device provided with a panel comprising a substrate comprising glass or resin, a front side laminated body provided on the viewer side of the substrate and a back side laminated body provided on the back side of the substrate, and an optical member adjacent to the back side laminated body of the panel, wherein the surface of the optical member going to contact with the back side laminated body has an arithmetic average roughness (Ra) of 6 μm or more and wherein the front side laminated body and the substrate are adhered via an adhesive layer and the thickness of the adhesive layer is 30 μm-100 μm.

10. The image display device according to claim 9, wherein the surface of the optical member going to contact with the back side laminated body has an arithmetic average roughness of 7 μm or more.

11. The image display device according to claim 9, wherein the surface of the panel on the viewer side is opened and the back side of the panel is closed with a casing.

12. The image display device according to claim 9, wherein the substrate is a liquid crystal cell and the back side laminated body includes an optical compensatory film.

13. The image display device according to claim 12, wherein the front side laminate body has a viewer side protective film provided on the viewer side, a polarizer, and a substrate side protective film provided on the substrate side in this order, and at least one of the viewer side protective film and the substrate side protective film comprises cellulose acylate.

14. The image display device according to claim 9 employing a liquid crystal display mode of VA system or IPS system.

15. The image display device according to claim 9 employing a liquid crystal display mode of TN system or OCB system.

* * * * *